US008665292B2

(12) United States Patent
Sakurai

(10) Patent No.: US 8,665,292 B2
(45) Date of Patent: Mar. 4, 2014

(54) COLOR GAMUT BOUNDARY INFORMATION GENERATING DEVICE, COLOR GAMUT BOUNDARY INFORMATION GENERATING METHOD, AND COMPUTER READABLE MEDIUM

(75) Inventor: Takuya Sakurai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 252 days.

(21) Appl. No.: 13/216,616

(22) Filed: Aug. 24, 2011

(65) Prior Publication Data

US 2012/0249521 A1    Oct. 4, 2012

(30) Foreign Application Priority Data

Mar. 29, 2011   (JP) ................................. 2011-073412

(51) Int. Cl.
*G09G 5/02*    (2006.01)

(52) U.S. Cl.
USPC ............................ 345/590; 345/589; 345/591

(58) Field of Classification Search
None
See application file for complete search history.

(56) References Cited

U.S. PATENT DOCUMENTS

| 4,169,285 | A  | * | 9/1979  | Walker  | 345/591 |
| 6,778,185 | B1 | * | 8/2004  | Moroney | 345/590 |
| 8,207,982 | B2 | * | 6/2012  | Tin     | 345/589 |
| 2010/0128055 | A1 | * | 5/2010 | Blonde et al. | 345/590 |
| 2012/0249520 | A1 | * | 10/2012 | Sakurai | 345/419 |

FOREIGN PATENT DOCUMENTS

| JP | A-2001-14492  | 1/2001  |
| JP | A-2006-352475 | 12/2006 |

* cited by examiner

*Primary Examiner* — Antonio A Caschera
(74) *Attorney, Agent, or Firm* — Oliff PLC

(57) ABSTRACT

A color gamut boundary information generating device includes a mapping unit, a triangulating unit, and a generating unit. The mapping unit maps boundary points existing at plural coordinates in a color space that is independent of an output device to corresponding points in a two-dimensional region while maintaining respective phases of the boundary points. The triangulating unit performs triangulation on the inside of a convex hull including plural points in the two-dimensional region obtained by the mapping unit, thereby generating triangulation information, which is a result of the triangulation. The generating unit generates color gamut boundary information on the basis of the triangulation information generated by the triangulating unit. The color gamut boundary information is information that specifies a three-dimensional shape in the color space, the three-dimensional shape having a boundary including the boundary points.

3 Claims, 5 Drawing Sheets

| IDENTIFICATION INFORMATION | COORDINATES OF BOUNDARY POINT | COORDINATES AFTER MAPPING (ON SPHERE) |
|---|---|---|
| 1 | (x1, y1, z1) | (u1, v1, w1) |
| 2 | (x2, y2, z2) | (u2, v2, w2) |
| ⋮ | ⋮ | ⋮ |

| IDENTIFICATION INFORMATION | COORDINATES OF BOUNDARY POINT | COORDINATES AFTER MAPPING (ON PLANE) |
|---|---|---|
| 1 | (x1, y1, z1) | (ξ1, η1, ζ1) |
| 2 | (x2, y2, z2) | (ξ2, η2, ζ2) |
| ⋮ | ⋮ | ⋮ |

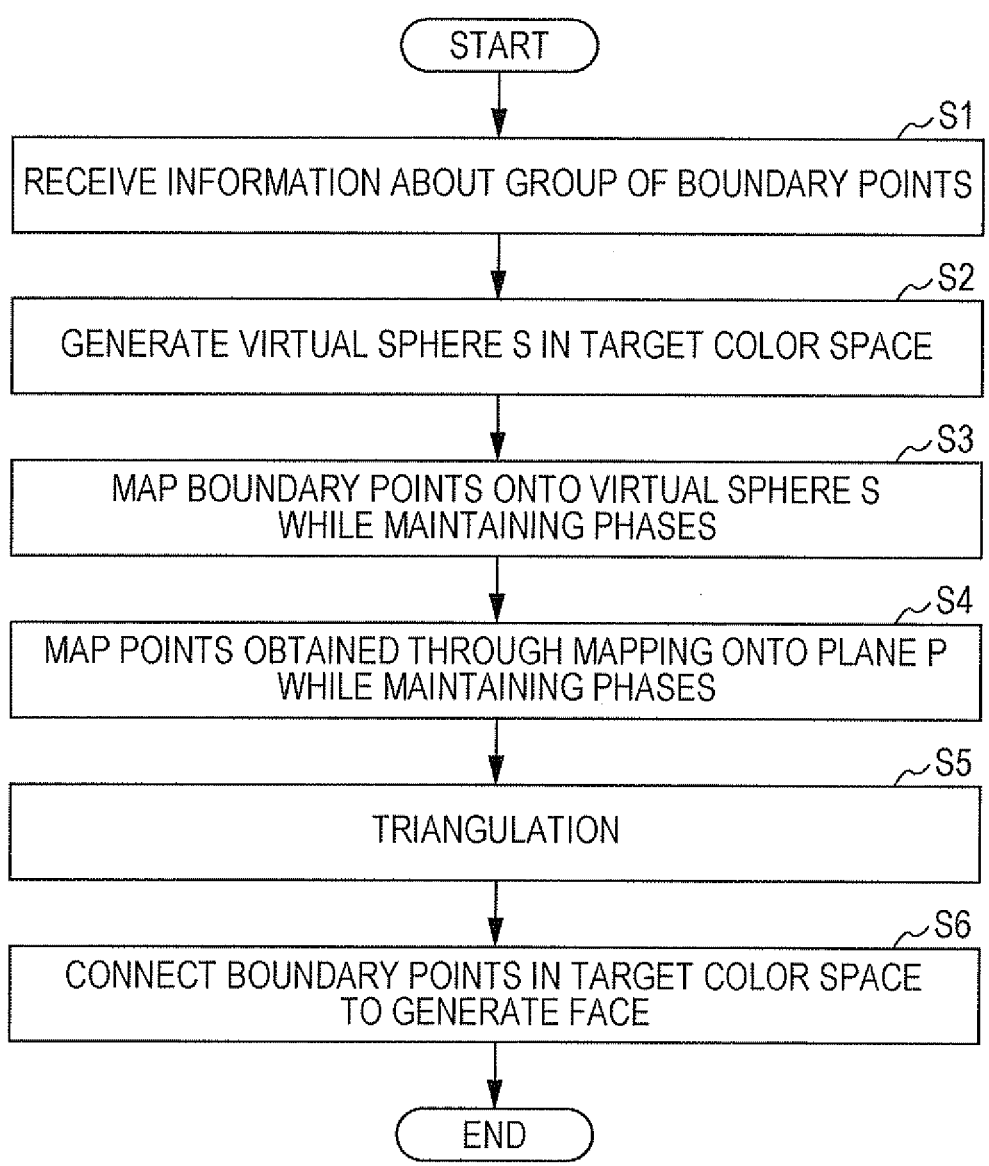

COLOR GAMUT BOUNDARY INFORMATION GENERATING DEVICE, COLOR GAMUT BOUNDARY INFORMATION GENERATING METHOD, AND COMPUTER READABLE MEDIUM

CROSS-REFERENCE TO RELATED APPLICATIONS

This application is based on and claims priority under 35 USC 119 from Japanese Patent Application No. 2011-073412 filed Mar. 29, 2011.

BACKGROUND

Technical Field

The present invention relates to a color gamut boundary information generating device, a color gamut boundary information generating method, and a computer readable medium.

SUMMARY

According to an aspect of the invention, there is provided a color gamut boundary information generating device including a mapping unit, a triangulating unit, and a generating unit. The mapping unit maps boundary points existing at plural coordinates in a color space that is independent of an output device to corresponding points in a two-dimensional region while maintaining respective phases of the boundary points. The triangulating unit performs triangulation on the inside of a convex hull including plural points in the two-dimensional region obtained by the mapping unit, thereby generating triangulation information, which is a result of the triangulation. The generating unit generates color gamut boundary information on the basis of the triangulation information generated by the triangulating unit. The color gamut boundary information is information that specifies a three-dimensional shape in the color space, the three-dimensional shape having a boundary including the boundary points.

BRIEF DESCRIPTION OF THE DRAWINGS

Exemplary embodiments of the present invention will be described in detail based on the following figures, wherein:

FIG. 7 is a flowchart illustrating an example process performed by the color gamut boundary information generating device according to the exemplary embodiment.

DETAILED DESCRIPTION

Hereinafter, an exemplary embodiment of the present invention will be described with reference to the attached drawings. A color gamut boundary information generating device 1 according to the exemplary embodiment is configured to obtain color gamut boundary information that is necessary for so-called gamut mapping, in which information about device independent colors is mapped to a reproducible color range of an output-target device. The color gamut boundary information generating device 1 is provided and used in a color printer, a color image forming device, a multifunction device including a scanner, an information processing device such as a computer for controlling these devices, or the like.

Figure 1:
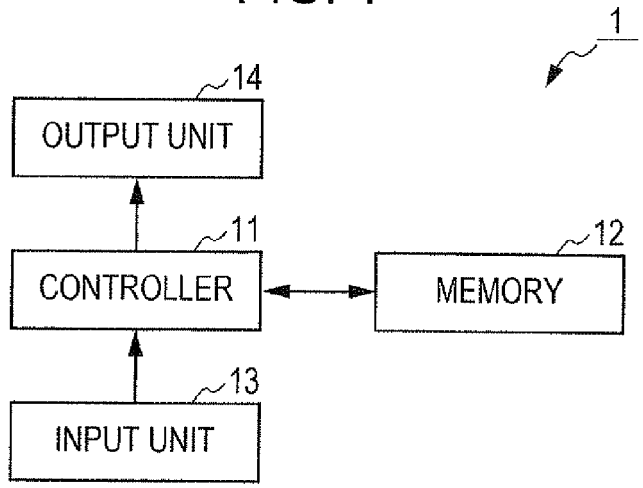
FIG. 1 is a block diagram illustrating an example configuration of a color gamut boundary information generating device according to an exemplary embodiment of the present invention.

The color gamut boundary information generating device 1 according to the exemplary embodiment includes a controller 11, a memory 12, an input unit 13, and an output unit 14, as illustrated in FIG. 1.

Here, the controller 11 is a program control device, such as a central processing unit (CPU), and operates in accordance with a program stored in the memory 12. In the exemplary embodiment, the controller 11 maps boundary points existing at plural coordinates in a color space that is independent of an output device to corresponding points in a two-dimensional region while maintaining respective phases of the boundary points. Also, the controller 11 performs triangulation on the inside of a convex hull including plural points in the two-dimensional region obtained through the mapping, thereby generating triangulation information, which is a result of the triangulation. Then, the controller 11 generates color gamut boundary information on the basis of the triangulation information obtained through the triangulation. The color gamut boundary information is information that specifies a three-dimensional shape in the color space, the three-dimensional shape having a boundary including the boundary points. The details of the process performed by the controller 11 will be described below.

The memory 12 is a memory device or the like, and stores a program executed by the controller 11. The program stored in the memory 12 may be provided by being stored in a computer readable recording medium, such as a digital versatile disc read only memory (DVD-ROM), and may be copied to the memory 12 so as to be stored therein. The memory 12 also operates as a working memory of the controller 11.

The input unit 13 is an interface device that receives input of information from an external device. In the exemplary embodiment, the input unit 13 receives input of information representing the coordinates in a target color space (a predetermined color space that is independent of an output device) of plural points (boundary points) existing on a surface of a color gamut that may be expressed by an output-target device and that is represented by a three-dimensional shape in the target color space. Then, the input unit 13 outputs the received information to the controller 11.

Here, the color space that is independent of an output device (hereinafter referred to as "device independent color space") is an XYZ color space, an L*a*b* color space, or the like. Information about boundary points may be obtained by performing color conversion on the basis of information about boundary points in a device color space, the information being obtained through color measurement performed on an image output from an output-target device. Also, information about boundary points may be obtained on the basis of a reference media gamut (RMG), which is a color gamut of a standard image (defined in an L*a*b* color space) defined by the International Color Consortium (ICC). Furthermore, boundary points may be extracted from a set of points in a color space corresponding to colors extracted from an image formed by an output-target device. A widely known method may be used as a method for obtaining or extracting these boundary points, and thus the detailed description thereof is omitted.

The output unit 14 outputs color gamut boundary information, which is information specifying the three-dimensional shape representing a reproducible color range of an output-target device in a target color space, in accordance with an instruction input from the controller 11.

Figure 2:
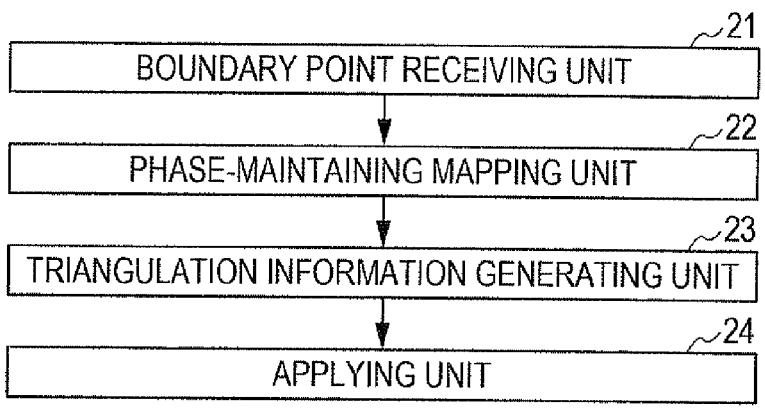
FIG. 2 is a block diagram illustrating an example functional configuration of the color gamut boundary information generating device according to the exemplary embodiment.
Figure 3:
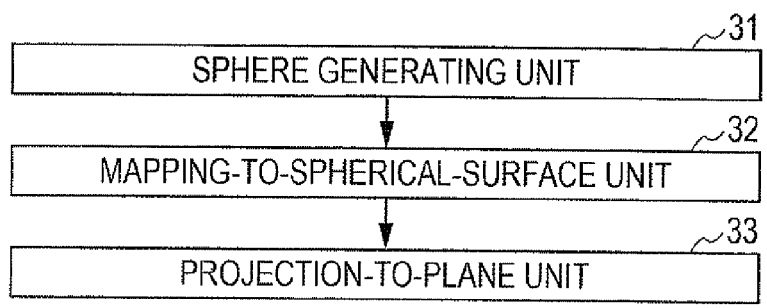
FIG. 3 is a block diagram illustrating an example functional configuration of a phase-maintaining mapping unit in the color gamut boundary information generating device according to the exemplary embodiment.

Next, an example of a process of generating color gamut boundary information performed by the controller 11 will be described. As illustrated in FIG. 2, the controller 11 according to the exemplary embodiment functionally includes a boundary point receiving unit 21, a phase-maintaining mapping unit 22, a triangulation information generating unit 23, and an applying unit 24. Also, according to an example of the exemplary embodiment, the phase-maintaining mapping unit 22 includes a sphere generating unit 31, a mapping-to-spherical-surface unit 32, and a projection-to-plane unit 33, as illustrated in FIG. 3.

The boundary point receiving unit 21 receives information about plural boundary points in a target color space that is independent of an output device, such as an L*a*b* color space. The phase-maintaining mapping unit 22 projects received boundary points onto a virtual plane P that is generated in the target color space while maintaining the phases of the boundary points. In the configuration illustrated in FIG. 3, the sphere generating unit 31 of the phase-maintaining mapping unit 22 generates a virtual sphere S in the target color space. The center (normal coordinates) of the virtual sphere S is positioned on an inner side of a virtual face where the boundary points received by the boundary point receiving unit 21 exist. In one example, the coordinates of the center may be the average of the coordinates of N boundary points received by the boundary point receiving unit 21. That is, when the coordinates of each boundary point are expressed by $(x_i, y_i, z_i)$, in which $i=1, 2, \ldots,$ and N, the coordinates of the center may be defined as $(\Sigma x_i/N, \Sigma y_i/N, \Sigma z_i/N)$. In another example, the center of the virtual sphere S may be regarded as the center of a definition region of the target color space (in the case of L*a*b*, L*=50.0, a*=0.0, and b*=0.0). The radius of the virtual sphere S is not specified, and may be a value predetermined for each color space. For example, in the case of L*a*b*, the radius r may be 0.5.

Figures 4A, 4B:
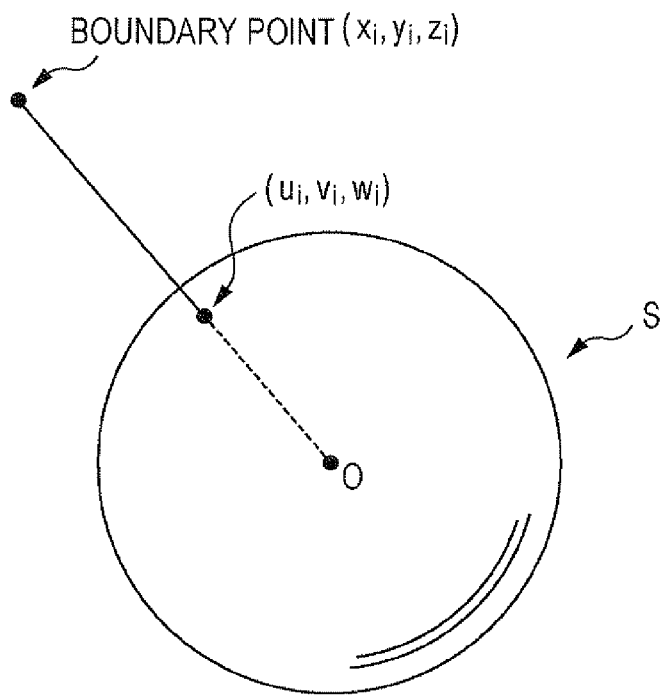
FIGS. 4A and 4B are explanatory diagrams illustrating an example of phase-maintaining mapping performed in the color gamut boundary information generating device according to the exemplary embodiment.

The mapping-to-spherical-surface unit 32 maps input boundary points $(x_i, y_i, z_i)$, in which $i=1, 2, \ldots,$ and N, onto the surface of the virtual sphere S. The mapping is performed while maintaining the phases of the boundary points so that the adjacency relationship among the boundary points is not changed (so that the nearest boundary point to a certain boundary point before mapping remains the nearest boundary point after mapping). Specifically, the mapping-to-spherical-surface unit 32 obtains the coordinates $(u_i, v_i, w_i)$ of the intersection of the surface of the virtual sphere S and a line segment that connects the center O (normal coordinates) of the virtual sphere S and a boundary point to be mapped, or the intersection of the surface of the virtual sphere S and a line extended from the line segment, and regards the coordinates of the intersection as the position to which the boundary point is to be mapped (FIG. 4A). The mapping-to-spherical-surface unit 32 stores, in the memory 12, pieces of identification information (represented by numbers i) for identifying original boundary points, the coordinates of the corresponding boundary points $(x_i, y_i, z_i)$, and the corresponding coordinates after mapping $(u_i, v_i, w_i)$ in association with one another (FIG. 4B).

The projection-to-plane unit 33 further maps each point $(u_i, v_i, w_i)$ on the surface of the sphere S obtained through the mapping of boundary points performed by the mapping-to-spherical-surface unit 32 onto the two-dimensional plane P. The mapping is performed while maintaining the phases of the points. In this case, stereographic projection illustrated in FIG. 5A may be used. In the stereographic projection, the plane P onto which a point is to be mapped is in contact with the virtual sphere S, a line segment that connects the contact point of the virtual sphere S and the plane P and the center of the virtual sphere S is extended, and the intersection of the extended line segment and the surface of the sphere S opposite to the plane P is regarded as the pole.

Figures 5A, 5B:
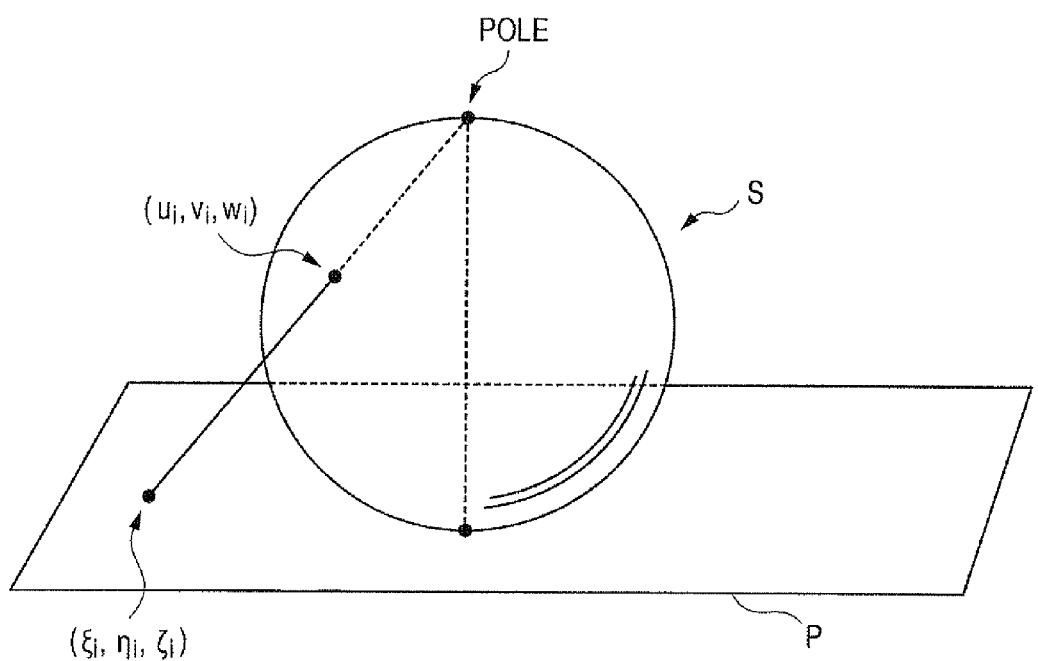
FIGS. 5A and 5B are explanatory diagrams illustrating another example of phase-maintaining mapping performed in the color gamut boundary information generating device according to the exemplary embodiment.

The projection-to-plane unit 33 extends individual line segments that connect the pole and the individual points $(u_i, v_i, w_i)$ on the sphere S obtained through the mapping of boundary points performed by the mapping-to-spherical-surface unit 32, and regards the individual intersections $(\xi_i, \eta_i, \zeta_i)$ of the extended line segments and the plane P as the coordinates to which the points are to be mapped. Then, the projection-to-plane unit 33 replaces the coordinates after mapping onto the sphere S $(u_i, v_i, w_i)$ with the corresponding coordinates after mapping onto the plane P $(\xi_i, \eta_i, \zeta_i)$ in the table in which the coordinates of the original boundary points $(x_i, y_i, z_i)$ are associated with the coordinates after mapping onto the sphere S $(u_i, v_i, w_i)$ (FIG. 5B). Accordingly, a table that stores the coordinates of the original boundary points $(x_i, y_i, z_i)$ and the coordinates after mapping onto the plane P $(\xi_i, \eta_i, \zeta_i)$ in association with each other is obtained. In this way, the phase-maintaining mapping unit 22 projects received boundary points onto the virtual plane P that is generated in the target color space, while maintaining the phases of the boundary points.

The triangulation information generating unit 23 executes a triangulation process by using the individual points $(\xi_i, \eta_i, \zeta_i)$ in the plane P obtained through the mapping performed by the phase-maintaining mapping unit 22 as vertexes. The process that is widely known as Delaunay triangulation may be applied to the triangulation, and thus the detailed description thereof is omitted here. With the execution of a Delaunay triangulation process, plural pairs of points in the plane P that are to be connected by edges in the triangulation are found. Specifically, the triangulation information generating unit 23 generates, as triangulation information, pairs of pieces of identification information for identifying vertexes that are to be connected by edges in the Delaunay triangulation.

For example, the foregoing triangulation information includes pieces of identification information of individual points that are associated with pieces of identification information of other points adjacent to the points (a list of pieces of identification information of connecting by side).

The applying unit 24 refers to the triangulation information generated by the triangulation information generating unit 23, and executes the following process on the individual boundary points $i=1, 2, \ldots,$ and N in the target color space. Specifically, the applying unit 24 reads the identification information of a point associated with identification information i, and connects the boundary point specified by the identification information associated with the read identification information with the boundary point specified by the identification information i by an edge, thereby generating a virtual face divided into triangles in the target color space. This face represents (at least part of) the boundary of a reproducible color range of an output-target device in the target color space. When this face is closed, the three-dimensional shape in the target color space defined by the face represents the reproducible color range of the output-target device. The applying unit 24 outputs, as color gamut boundary information, information that specifies the three-dimensional shape obtained thereby. The information is not specified as long as it represents the three-dimensional shape in the target color space generated by the applying unit 24. For example, the color gamut boundary information may include coordinate information of boundary points and triangulation information.

The phase-maintaining mapping unit 22 is not limited to that described above. For example, the mapping-to-spherical-surface unit 32 may use the following expressions in order to map input boundary points (xi, yi, zi), in which i=1, 2, ..., and N, onto the surface of the virtual sphere S while maintaining the phases of the boundary points.

That is, in the case of an L*a*b* color space, for example, the following expression is used.

$$C = \sqrt{a^{*2} + b^{*2}} \quad (1)$$

A rotational body of a quadric curve expressed by $$L^* = \alpha \cdot C^{*2} + L_0^* \quad (2)$$

in an L*C* plane (note that L*0 is the value of an L* component of the center coordinates of a virtual sphere) is used to obtain α=αi (i=1, 2, ..., and N) for the individual boundary points i=1, 2, ..., and N to be mapped when the boundary points exist on the rotational body.

Then, in a plane Q including the center (normal coordinates) of the virtual sphere S and a boundary point i, the intersection of the virtual sphere S and a quadric curve obtained by cutting the rotational body of the quadric curve expressed by the following expression is obtained.

$$L^* = \alpha_i \cdot C^{*2} + L_0^* \quad (3)$$

Figure 6:
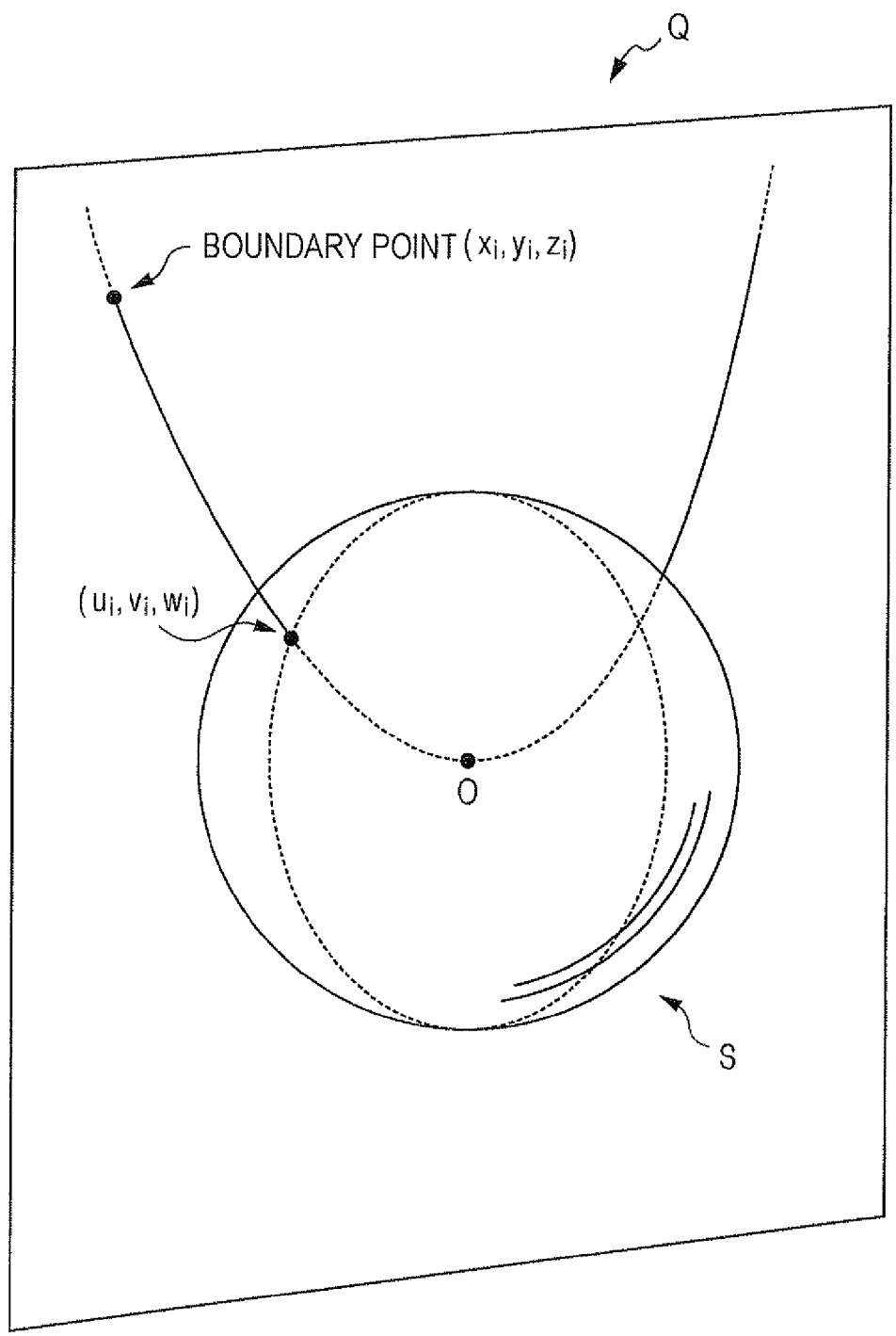
FIG. 6 is an explanatory diagram illustrating still another example of phase-maintaining mapping performed in the color gamut boundary information generating device according to the exemplary embodiment.

At this time, two intersections are obtained. Among the two intersections, the intersection nearer to the boundary point i is selected, the coordinates thereof (ui, vi, wi) are obtained, and the coordinates are regarded as the position to which the boundary point is to be mapped (FIG. 6).

Then, the mapping-to-spherical-surface unit 32 stores, in the memory 12, the identification information (here, the number i) for identifying the original boundary point, the coordinates of the corresponding boundary point (xi, yi, zi), and the corresponding coordinates after mapping (ui, vi, wi) in association with one another. As in this example, each boundary point may be connected to the center of the sphere by a curve expressed by a nonlinear function (quadric is used here, but another function may be used), and the intersection of the curve and the virtual sphere S may be used as the position to which the boundary point is mapped. In this case, the radius of the virtual sphere S is set to a sufficiently large value so that the interval between the points after mapping is not less than machine epsilon.

Next, an example operation of the color gamut boundary information generating device 1 according to the exemplary embodiment will be described with reference to FIG. 7. A user inputs information about plural boundary points in a device independent target color space, such as an L*a*b* color space, obtained from an image or the like output from an output-target device.

The color gamut boundary information generating device 1 receives the information (step S1), and generates a virtual sphere S in the target color space (step S2). Then, the color gamut boundary information generating device 1 maps the input boundary points (xi, yi, zi), in which i=1, 2, ..., and N, onto the surface of the virtual sphere S while maintaining the phases of the boundary points, that is, by using mapping of performing sequential deformation (step S3). The color gamut boundary information generating device 1 stores pieces of identification information (here, numbers i) for identifying the boundary points, the coordinates of the corresponding boundary points (xi, yi, zi), and the corresponding coordinates after mapping (ui, vi, wi) in association with one another.

Subsequently, the color gamut boundary information generating device 1 further maps the individual points (ui, vi, wi) on the surface of the virtual sphere S obtained through the mapping of the boundary points onto a virtual plane P in the target color space (step S4). This mapping operation is also performed while maintaining the phases of the boundary points, that is, by using mapping of performing sequential deformation. The color gamut boundary information generating device 1 replaces the coordinates after mapping onto the sphere S (ui, yi, wi) with the corresponding coordinates after mapping onto the plane P ($\xi_i$, $\eta_i$, $\zeta_i$) in the table in which the coordinates of the original boundary points (xi, yi, zi) are associated with the coordinates after mapping onto the sphere S (ui, vi, wi). Accordingly, a table in which the identification information of the original boundary points and the coordinates thereof (xi, yi, zi) are associated with the coordinates after mapping onto the plane P ($\xi_i$, $\eta_i$, $\zeta_i$) is obtained.

The color gamut boundary information generating device 1 executes a triangulation process by regarding the individual points ($\xi_i$, $\eta_i$, $\zeta_i$) in the plane P as vertexes (step S5). The process that is widely known as Delaunay triangulation may be applied to the triangulation. With the execution of a Delaunay triangulation process, plural pairs of points in the plane P that are to be connected to each other by edges in the triangulation are found.

Furthermore, the color gamut boundary information generating device 1 refers to the triangulation information in order to obtain information about boundary points that are to be connected to the individual boundary points i=1, 2, ..., and N in the target color space by edges, and connects the points by edges. Accordingly, the color gamut boundary information generating device 1 generates a virtual face divided into triangles in the target color space (step S6).

Alternatively, the color gamut boundary information generating device 1 may be used in the following case. That is, a face representing a color gamut that is reproducible in a method according to the related art is generated in a device dependent color space, and the face is converted into a face in a device independent color space, such as an L*a*b* color space. At this time, there is a possibility that a defect occurs on the face obtained by connecting boundary points.

In order to address such a defect, a user is caused to specify a range (region in the L*a*b* color space) where the user recognizes that there is a defect (for example, a range in a sphere having a radius specified from a certain position of (L*, a*, b*), information about the boundary points existing in the specified range is input to the color gamut boundary information generating device 1 according to the exemplary embodiment, a face is formed by the color gamut boundary information generating device 1, and the portion related to the corresponding boundary points in the triangulation information generated in a method according to the related art is replaced with the information about the formed face (triangulation information). Accordingly, triangulation may be directly performed on plural boundary points in a device independent color space, and a partial face having no defect may be generated.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color gamut boundary information generating device comprising:
   at least one processor;
   at least one memory, the at least one memory storing instructions that when executed cause the at least one processor to perform as:
      a mapping unit that maps boundary points existing at a plurality of coordinates in a color space that is independent of an output device to corresponding points in a two-dimensional region while maintaining respective phases of the boundary points, each boundary point being mapped by:
         obtaining an intermediate coordinate located at an intersection of a surface of a virtual sphere and a line segment that connects a center of the virtual sphere and the coordinate in the two-dimensional region; and
         obtaining each boundary point being an intersection in the two-dimensional region of a line segment that intersects the intermediate coordinate and a point on a pole of the virtual sphere, the pole of the virtual sphere intersecting the center and being normal to the two-dimensional region;
      a triangulating unit that performs triangulation on the inside of a convex hull including a plurality of points in the two-dimensional region obtained by the mapping unit, thereby generating triangulation information, which is a result of the triangulation; and
      a generating unit that generates color gamut boundary information on the basis of the triangulation information generated by the triangulating unit, the color gamut boundary information being information that specifies a three-dimensional shape in the color space, the three-dimensional shape having a boundary including the boundary points.

2. A color gamut boundary information generating method comprising:
   mapping boundary points, performed by a processor, the boundary points existing at a plurality of coordinates in a color space that is independent of an output device to corresponding points in a two-dimensional region while maintaining respective phases of the boundary points, each boundary point being mapped by:
      obtaining an intermediate coordinate located at an intersection of a surface of a virtual sphere and a line segment that connects a center of the virtual sphere and the coordinate in the two-dimensional region; and
      obtaining each boundary point being an intersection in the two-dimensional region of a line segment that intersects the intermediate coordinate and a point on a pole of the virtual sphere, the pole of the virtual sphere intersecting the center and being normal to the two-dimensional region;
   performing triangulation on the inside of a convex hull including a plurality of points in the two-dimensional region obtained through the mapping, thereby generating triangulation information, which is a result of the triangulation; and
   generating color gamut boundary information on the basis of the triangulation information generated through the triangulation, the color gamut boundary information being information that specifies a three-dimensional shape in the color space, the three-dimensional shape having a boundary including the boundary points.

3. A non-transitory computer readable medium storing a program causing a computer to execute a process, the process comprising:
   mapping boundary points existing at a plurality of coordinates in a color space that is independent of an output device to corresponding points in a two-dimensional region while maintaining respective phases of the boundary points, each boundary point being mapped by:
      obtaining an intermediate coordinate located at an intersection of a surface of a virtual sphere and a line segment that connects a center of the virtual sphere and the coordinate in the two-dimensional region; and
      obtaining each boundary point being an intersection in the two-dimensional region of a line segment that intersects the intermediate coordinate and a point on a pole of the virtual sphere, the pole of the virtual sphere intersecting the center and being normal to the two-dimensional region;
   performing triangulation on the inside of a convex hull including a plurality of points in the two-dimensional region obtained through the mapping, thereby generating triangulation information, which is a result of the triangulation; and
   generating color gamut boundary information on the basis of the triangulation information generated through the triangulation, the color gamut boundary information being information that specifies a three-dimensional shape in the color space, the three-dimensional shape having a boundary including the boundary points.

* * * * *